Dec. 1, 1936. C. A. A. G. SABAEFF 2,062,829
PROPELLENT EXERCISING DEVICE
Filed May 31, 1935    2 Sheets-Sheet 1
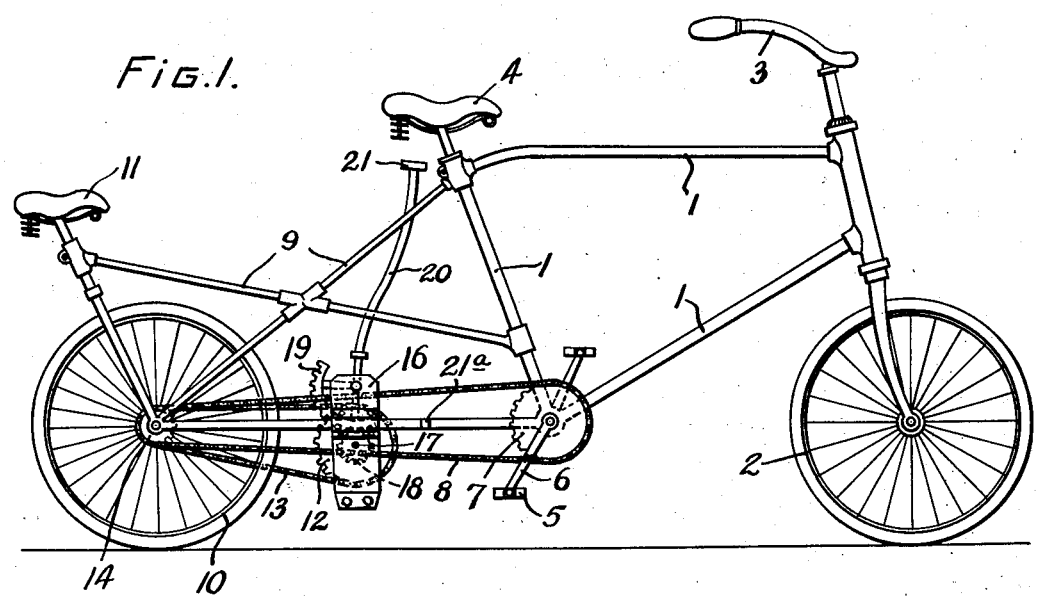
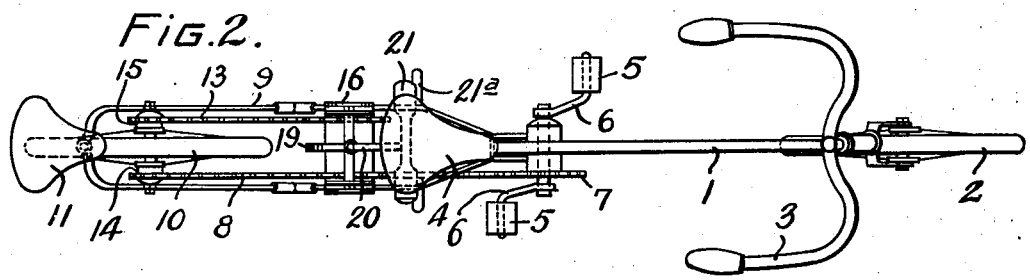
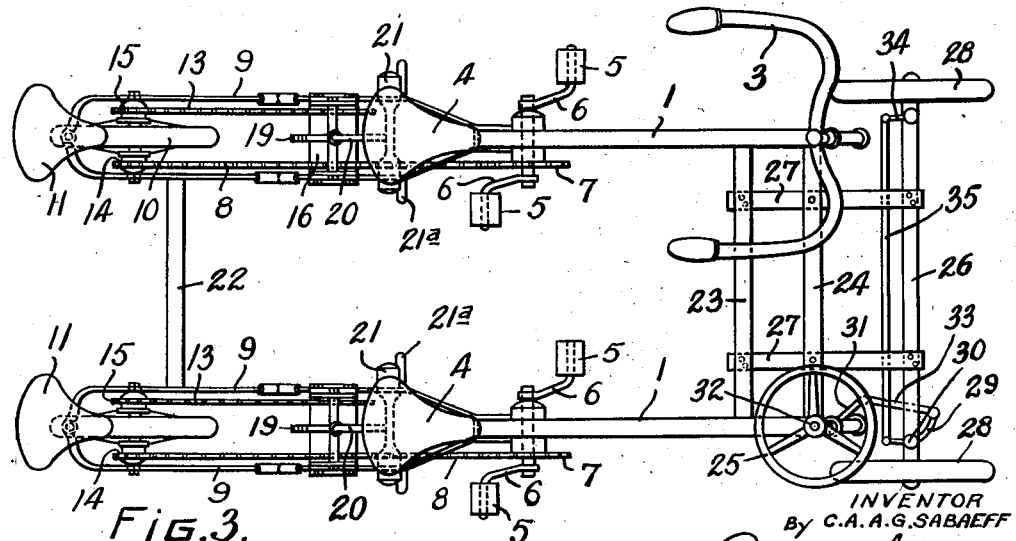
INVENTOR
By C.A.A.G. SABAEFF
Attorney.

Dec. 1, 1936.   C. A. A. G. SABAEFF   2,062,829
PROPELLENT EXERCISING DEVICE
Filed May 31, 1935   2 Sheets-Sheet 2
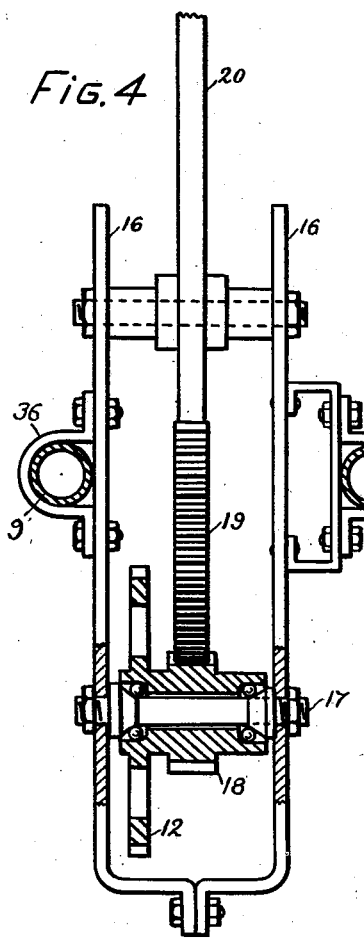
Fig. 4
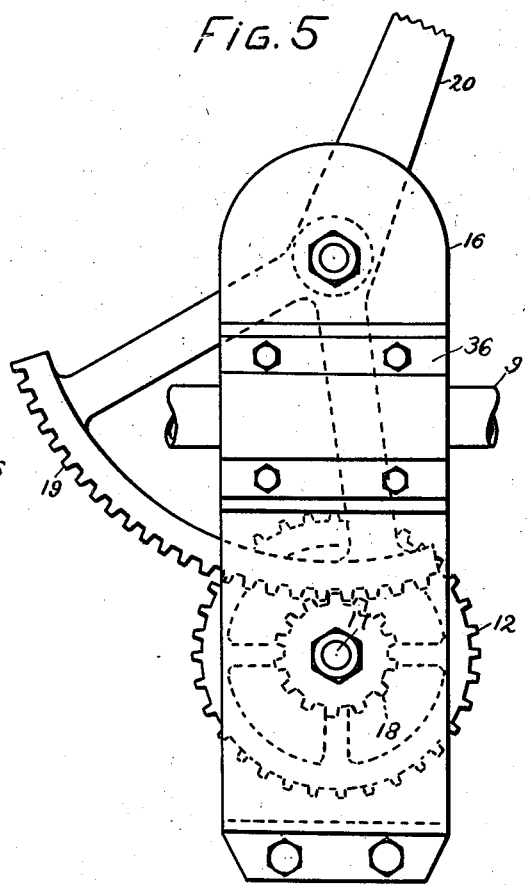
Fig. 5
Fig. 6
CLEMENT A.A.G. SABAEFF
INVENTOR
BY John P. Mironow
ATTORNEY Patented Dec. 1, 1936

2,062,829

UNITED STATES PATENT OFFICE 2,062,829

PROPELLENT EXERCISING DEVICE

Clément Antoine Alfred George Sabaeff, Montreal, Quebec, Canada

Application May 31, 1935, Serial No. 24,301

4 Claims. (Cl. 208—32)

The present invention relates to improvements in propellent exercising apparatuses which embodies among several characteristics the combination of a bicycle actuated by means of the usual pedals and by hand operated means located preferably in the rear.

The bicycle is preferably adapted for two or more users and while the person sitting in front actuates it by means of the pedals, the one sitting in the rear actuates same by means of a hand lever, thus exercising the muscles of the legs as well as exercising the muscles of the arms, shoulders and abdomen. As both mechanisms are of the free-wheeling type, the bicycle may be operated independently by one or the other mechanism or by both simultaneously.

In the drawings:—

Figure 1 is a side elevation view of a preferred form of the invention;

Figure 2 is a top view of Figure 1;

Figure 3 is a top view of a modified form of the invention;

Fig. 4 is a detail view of a gear mechanism assembly;

Fig. 5 is a side view of the same; and

Fig. 6 is a detail view of a freewheeling rear sprocket.

Like numerals of reference indicate corresponding parts in each figure.

Referring to the drawings, 1 is the main frame of a bicycle having the front wheel 2, handle bars 3, the front seat 4, the pedals 5, the crank hanger 6, the sprocket wheel 7, the sprocket chain 8, all of which are of common construction in bicycles.

From the frame 1 extends rearwardly a frame 9 upon which is mounted the rear wheel 10 and the rear seat 11, the sprocket wheel 12 and sprocket chain 13. Both sprocket chains 8 and 13 engage the rear wheel sprockets 14 and 15 respectively mounted upon the rear wheel 10.

Upon the frame 9 is preferably secured by clamps 36 the bracket 16 in which is journalled the shaft 17 upon which is mounted the sprocket wheel 12 and gear 18, and said gear 18 cooperates with the quadrant gear 19 which is also journalled in bracket 16. To said quadrant gear 19 is rigidly secured at its lower end the lever 20 and at its upper end is provided a cross-handle 21.

Upon actuating the pedals 5, the sprocket gear 7 imparts motion to the sprocket chain 8, which in turn causes the rear sprocket 14 to rotate the rear wheel 10. Similarly the rear wheel is rotated by means of the lever 20, when said lever is oscillated to and fro, which imparts motion to the quadrant gear 19 and causes the gear 18 to rotate the shaft 17 upon which is fixedly mounted the sprocket gear 12 which in turn actuates the sprocket chain 13 and simultaneously the rear sprocket 15 and wheel 10. A foot rest 21a is conveniently provided upon the frame 9 for the user of the rear seat 11.

In Figure 3 of the drawings is disclosed a modified form of the present invention, and which is a duplication of the elements disclosed in Figures 1 and 2. In this modified form of the invention, four persons may be accommodated. The frames 1 and 9 are duplicated and secured at a suitable distance from one another by means of the cross-braces 22, 23, and 24. Upon one of the frames, the handle bars 3 are replaced by a steering wheel 25, and the front wheel 2 is removed. In place of the front wheel is provided a frame consisting of the axle 26 which is rigidly secured to the cross-braces 23 and 24 by means of the brackets 27, and at each end of said axle is pivotally mounted the front wheels 28. The said wheels are suitably operated by means of the lever 29 fulcrumed at 30, one end of which is pivotally connected to the lever 31 fixedly secured at the lower end of the steering shaft 32 by means of the connecting link 33 and the other end of said lever 29 is pivotally connected to the lever 34 by means of the connecting rod 35. Upon actuating the steering wheel, the wheels 28 are readily turned in similar fashion to the steering arrangement of an automobile.

What I claim as my invention is:—

1. A propellent exercising apparatus, in combination with a main frame having a front wheel, handle bars, seat, sprocket wheel, crank-hangers and pedals, a rear frame rigidly connected to said main frame having a seat and a rear wheel, sprocket gears mounted upon said wheel, a shaft suitably journalled upon said rear frame, a sprocket wheel fixedly mounted upon said shaft, sprocket chains respectively connecting said sprocket wheels to said sprocket gears, a gear fixedly mounted upon said shaft, a quadrant gear co-acting wtih said gear, a lever rigidly mounted upon said quadrant-gear, and a cross-handle upon said lever.

2. A propellent exercising apparatus, in combination with a frame having main and rear portions, front and rear wheels, handle bars, seat, pedals, and operative connections between the pedals and the rear wheel, a bracket supported on the rear portion of the frame, a sprocket rotatively supported on said bracket, a corresponding sprocket on the rear wheel, a chain connecting said sprockets, a rear seat on the rear frame portion, a lever rotatively mounted on the bracket and adapted to be oscillated to and fro by a person sitting on the rear seat, and operative connections between the lever and the sprocket for imparting rotation to the rear wheel through said chain.

3. A propellent exercising apparatus, in combination with a frame having main and rear portions, front and rear wheels on the frame, front and rear seats, pedals, and operative connections between the pedals and the rear wheel, a bracket supported on the rear frame portion, a lever rotatively supported on said bracket, said lever being adapted to be manually oscillated in the plane of said frame, a handle on the end of the lever adapted to be held by the hands of the occupant of the rear seat for oscillating the lever, operative connections between said lever and said rear wheel for rotating the wheel when the lever is oscillated, and means to render said connections operative only for one direction of movement of the lever.

4. A propellent exercising apparatus, in combination with a frame having main and rear portions, front and rear wheels, front and rear seats, pedals, operative connections between the pedals and the rear wheel, a bracket supported on the rear frame portion, a sprocket rotatively supported on said bracket, a free-wheeling sprocket on the rear wheel, a chain connecting said sprockets, a gear firmly connected with the sprocket, a quadrant gear in mesh with said gear and rotatively supported on said bracket, a lever with a handle extending from said quadrant gear and adapted to be oscillated to and fro by a person occupying the rear seat, and a foot rest for said person on the frame.

CLÉMENT ANTOINE ALFRED
GEORGE SABAEFF.